United States Patent Office 3,438,238
Patented Apr. 15, 1969

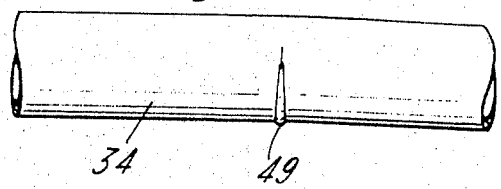
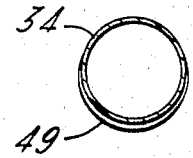
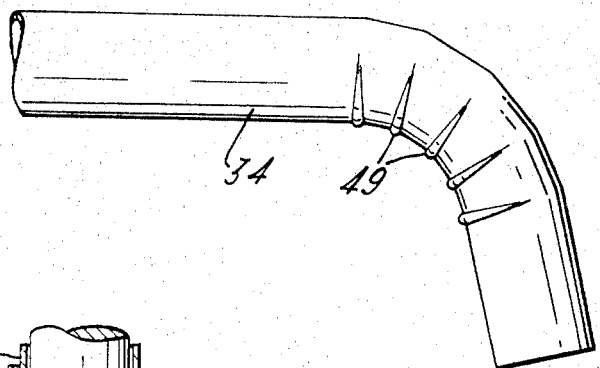
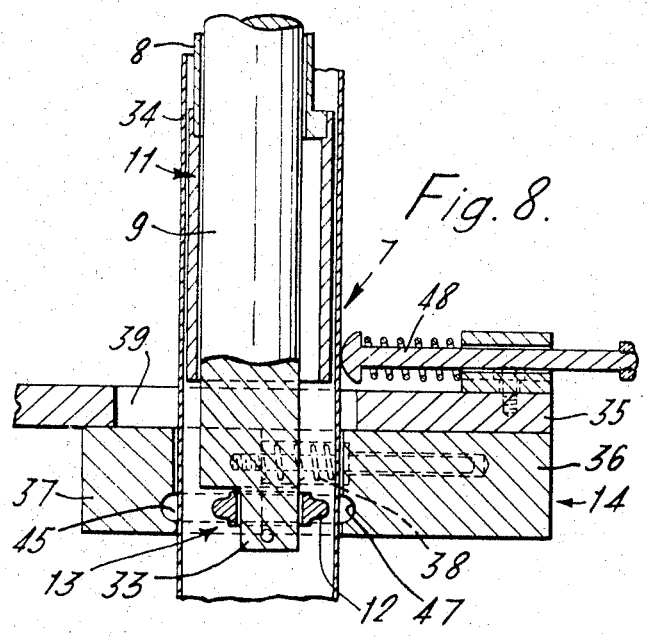

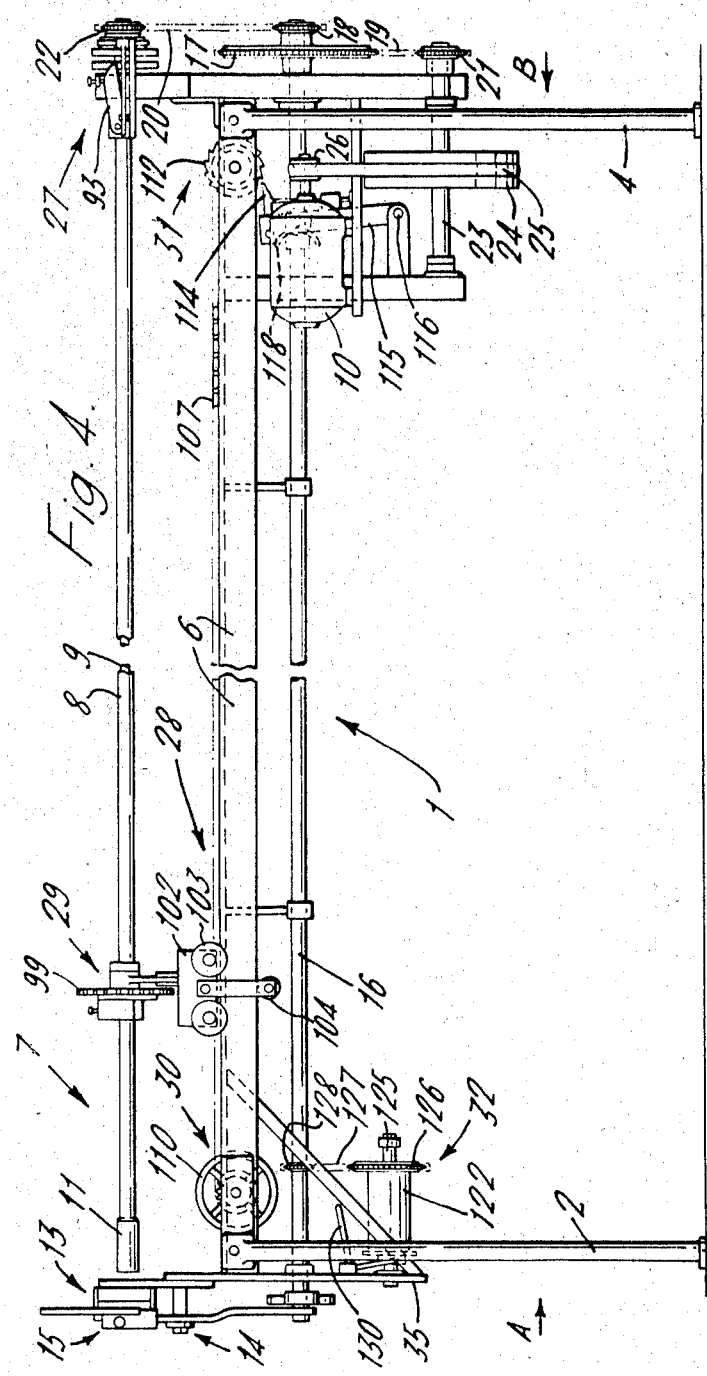

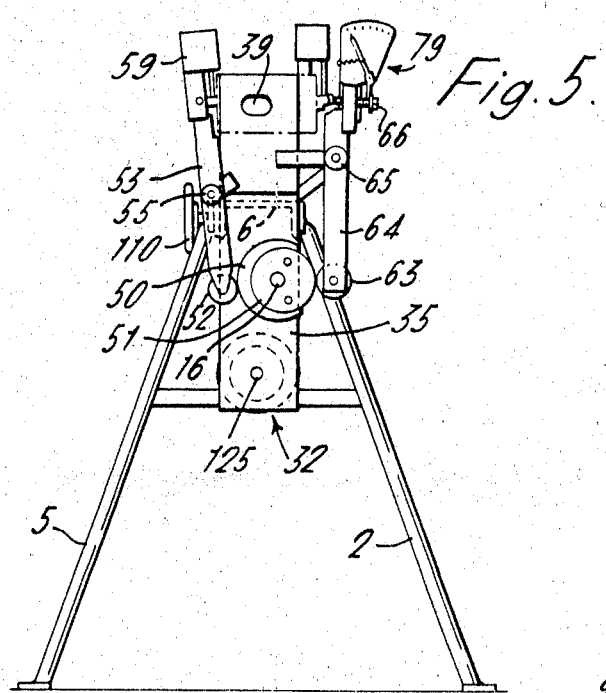
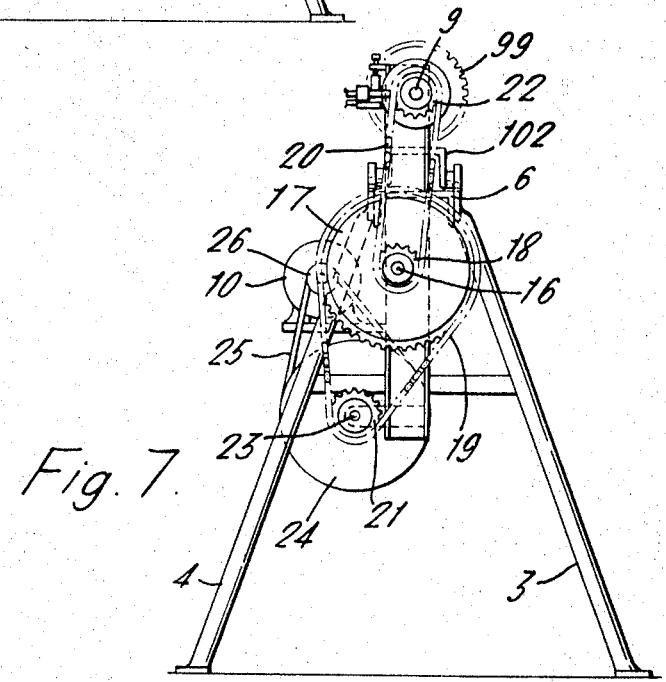

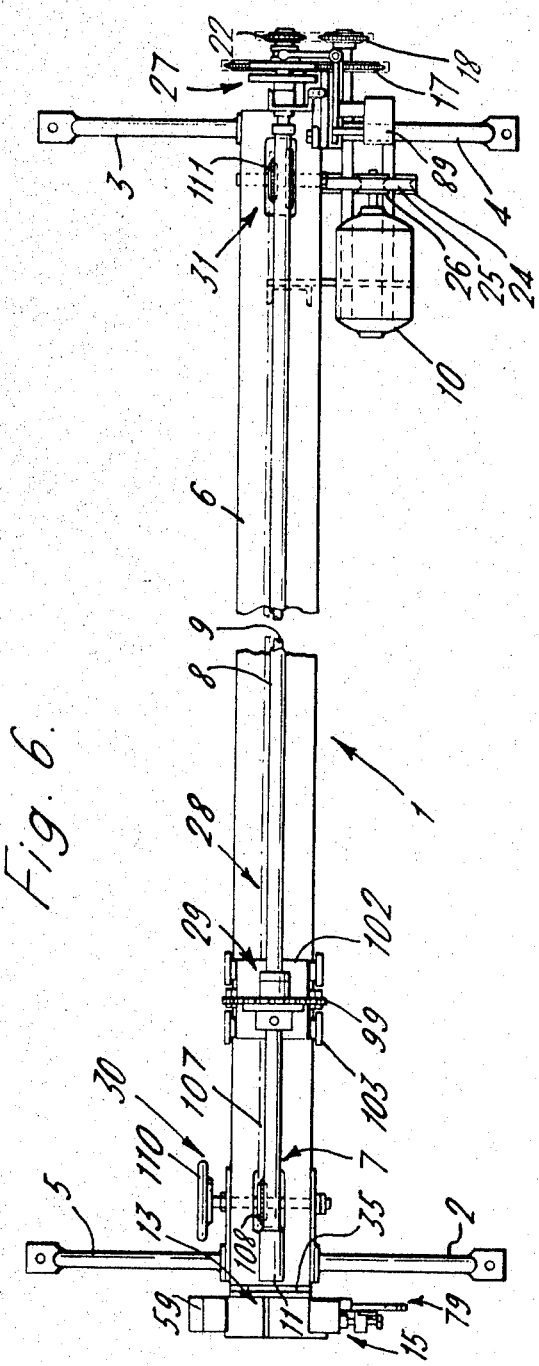

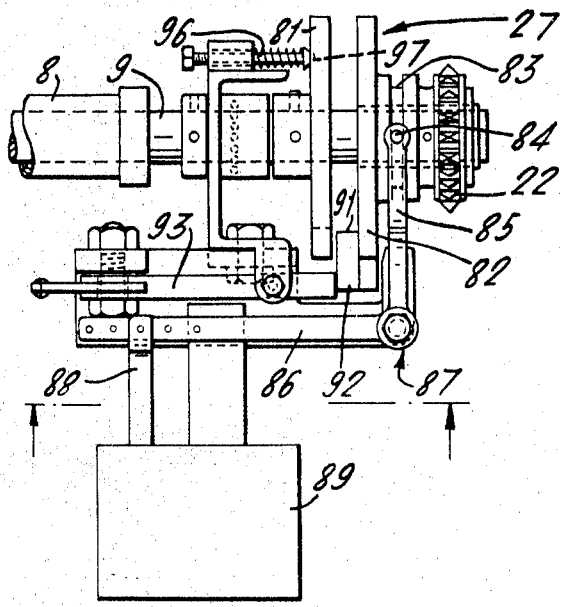
Fig. 21.
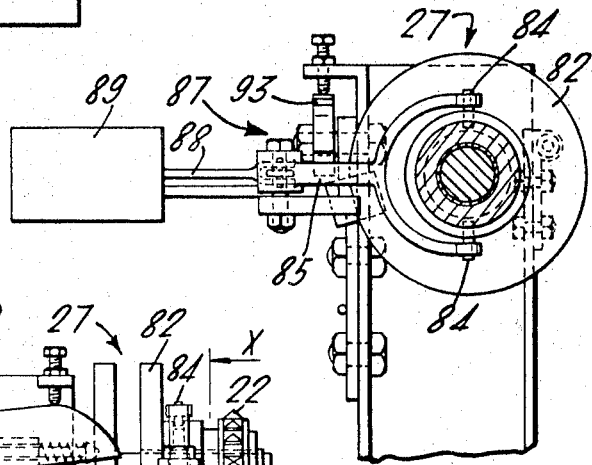
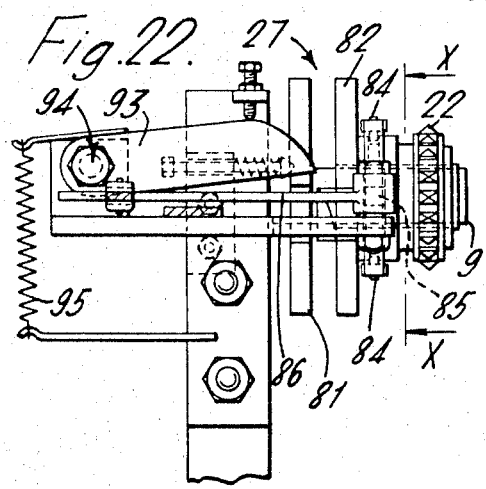
Fig. 22.
Fig. 23.

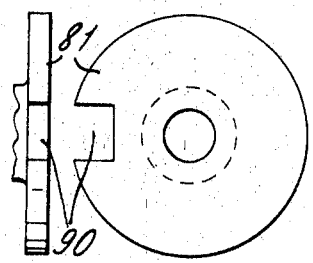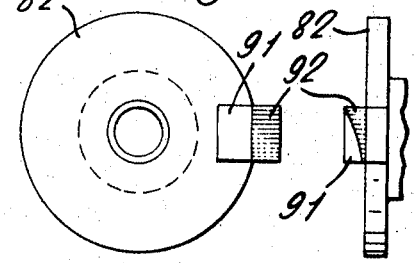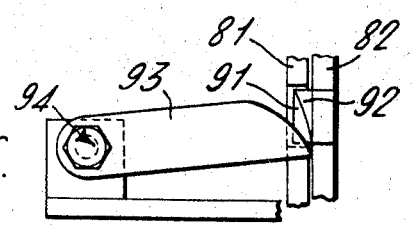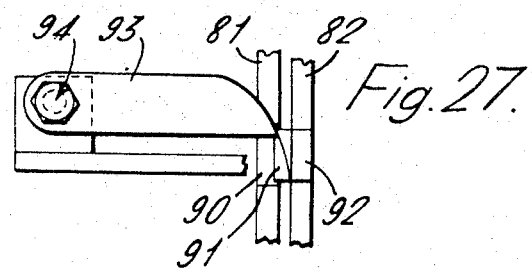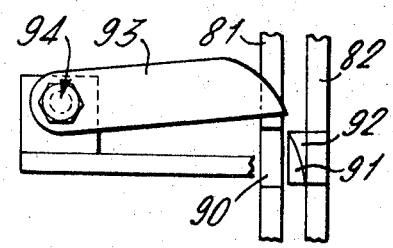

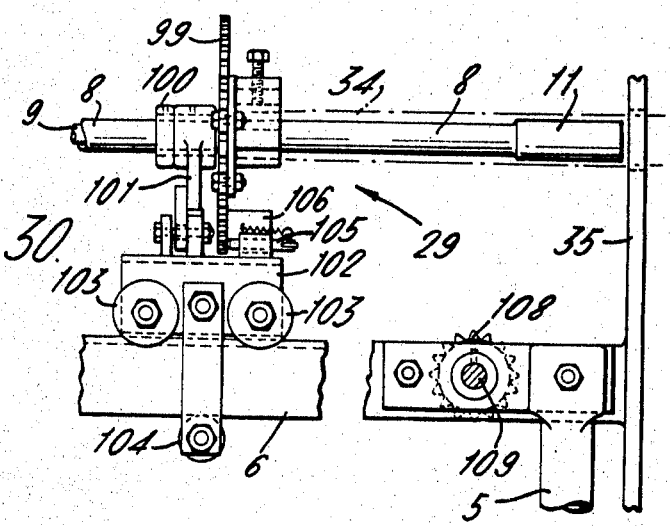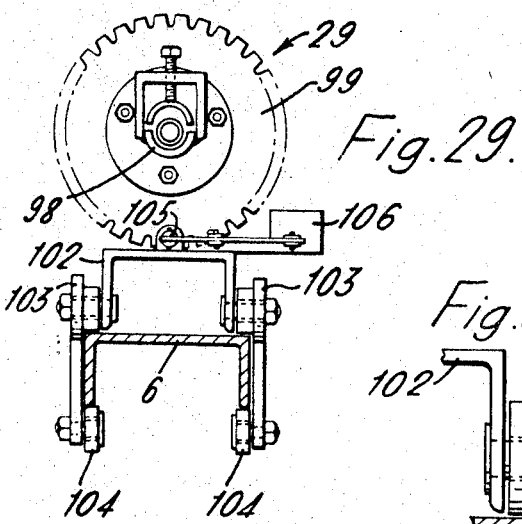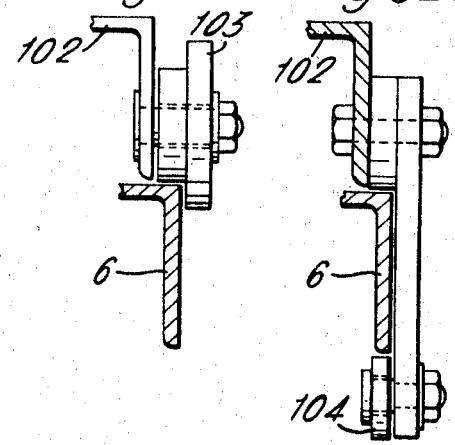

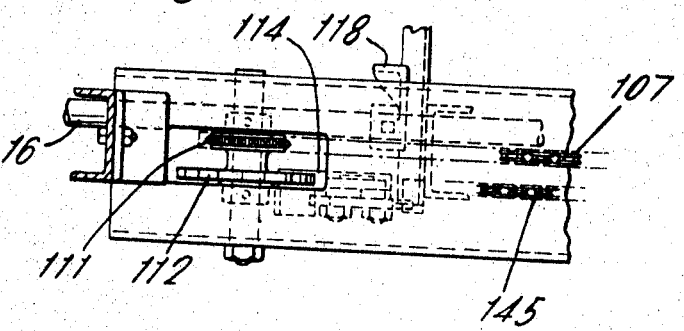
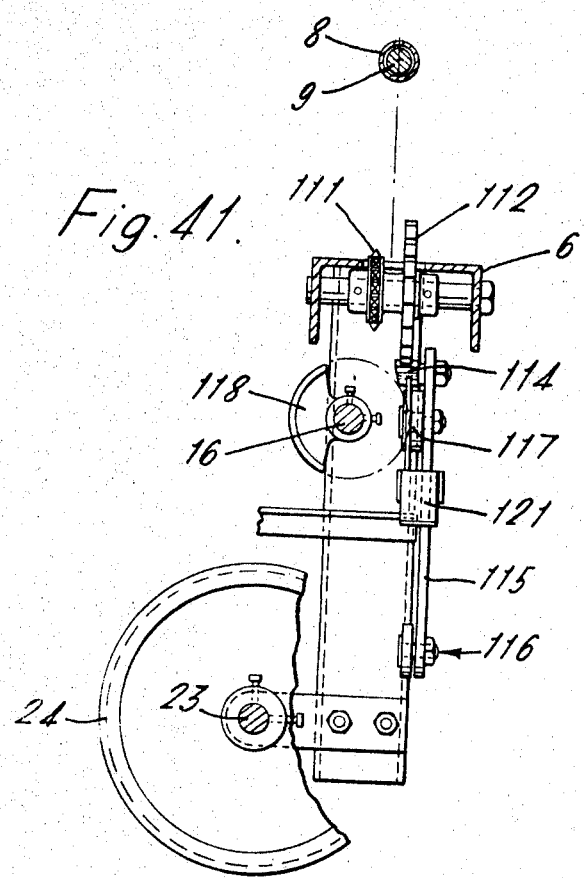

3,438,238
METHODS OF SHAPING METAL TUBING AND
APPARATUS USED THEREFOR
Jack Crowe and Kenneth Arthur Wallis, both of 18
Rongotai Road, Wellington, North Island, New
Zealand
Filed June 1, 1966, Ser. No. 554,587
Int. Cl. B21d 9/14
U.S. Cl. 72—369                                    24 Claims

ABSTRACT OF THE DISCLOSURE

The bending of ductile metal tubing in which the tubing to be bent is supported adjacent to the location where the bend is to be formed and an externally protruding rib is formed around substantially at least half of the circumference of the tube. The tube is advanced forwardly from the support and a force is applied in front of the formed rib and on the side of the tube substantially diametrically opposite the maximum protuberance of the rib for bending the tube by at least partially collapsing the rib and a further rib is formed in the tube. The procedure is repeated until the desired bend is effected.

---

This invention relates to methods for bending ductile metal tubing and/or apparatus used therefor.

The invention has been particularly although not solely adapted to form motor vehicle exhaust pipes from stainless steel tubing of approximately one and a half inch internal diameter.

It is an object of the present invention to provide a method of bending ductile metal tubing and/or apparatus used therefor whereby ductile tubular material and preferably stainless steel tubing can be bent without being softened by heating or without being appreciably weakened.

More particularly the object of the present invention is to bend the tube by forming successive transverse ribs which protrude externally around half or more of the circumference of the tube and then holding the tube and applying a force thereto so that the rib may be partially collapsed and a bend of several degrees may be formed with this sequence repeated until the desired bend is formed.

In this way the bending can easily be accomplished without substantially weakening the tube to any pronounced extent as excess material is progressively folded on the inside of the bend rather than the tube being stretched on the outside of the bend.

One preferred form of the invention will now be described which has been particularly adapted to form motor vehicle exhaust pipes from stainless steel tubing of one and a half inches internal diameter and 20 British Standard Gauge thickness, there being a straight welded lap seam along the length of the tube.

A brief explanation of the working of the apparatus is as follows:

A tube support means lies within the tube to be bent and provides an internal support for the tube preferably in a horizontal plane so that a cam which forms part of a rib forming means and which is mounted eccentrically to the axis of the tube forms an eccentric rib in the tube when the cam is rotated. Suitably shaped external clamping blocks, each having a semi-circular channel in one face clamp around the tube when a rib is being formed and thus provide an external support for the tube. Each clamping block is provided with a semi-circumferential groove in which the rib lies as it is formed.

The clamping blocks are then slid apart so that the tube may be advanced a short distance. The clamping blocks then clamp the tube once more while a force is applied by means of a suitably shaped forcing block to the tube in front of the formed rib and on the opposite side of the maximum protuberance of the rib to cause the tube to bend about the rib which partially collapses.

The apparatus will now be described with reference to the accompanying drawings in which:

FIGURE 1 shows a tube with one rib formed therein,

FIGURE 2 is an end view of FIGURE 1,

FIGURE 3 shows a tube having a plurality of ribs forming a bend,

Figure 9:
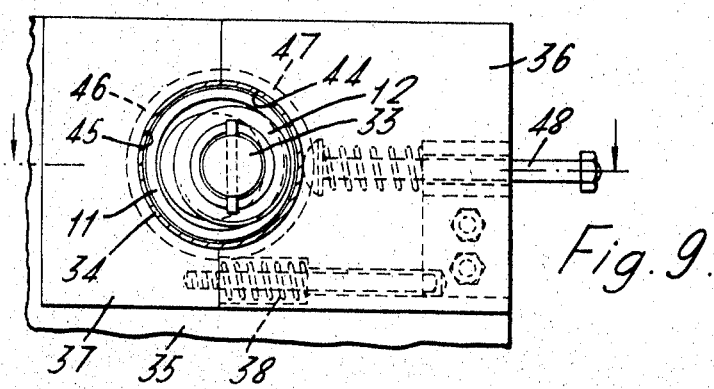
Figure 10:
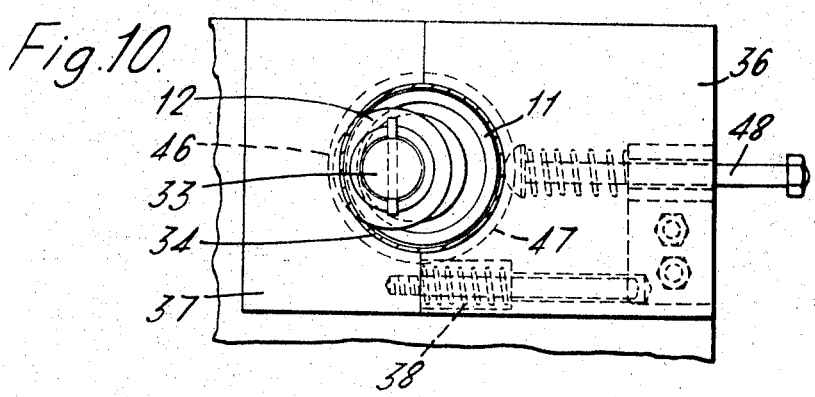
Figure 11:
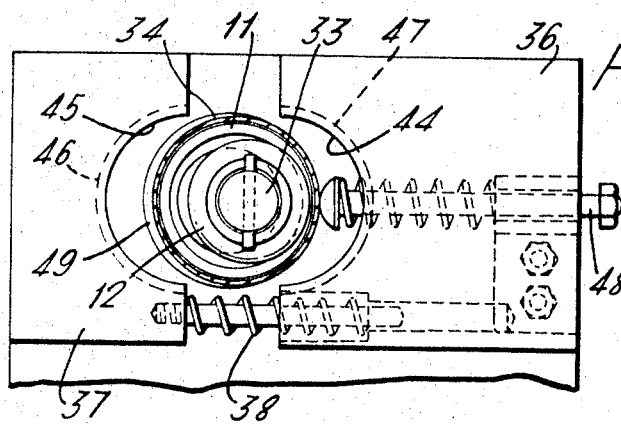
Figure 12:
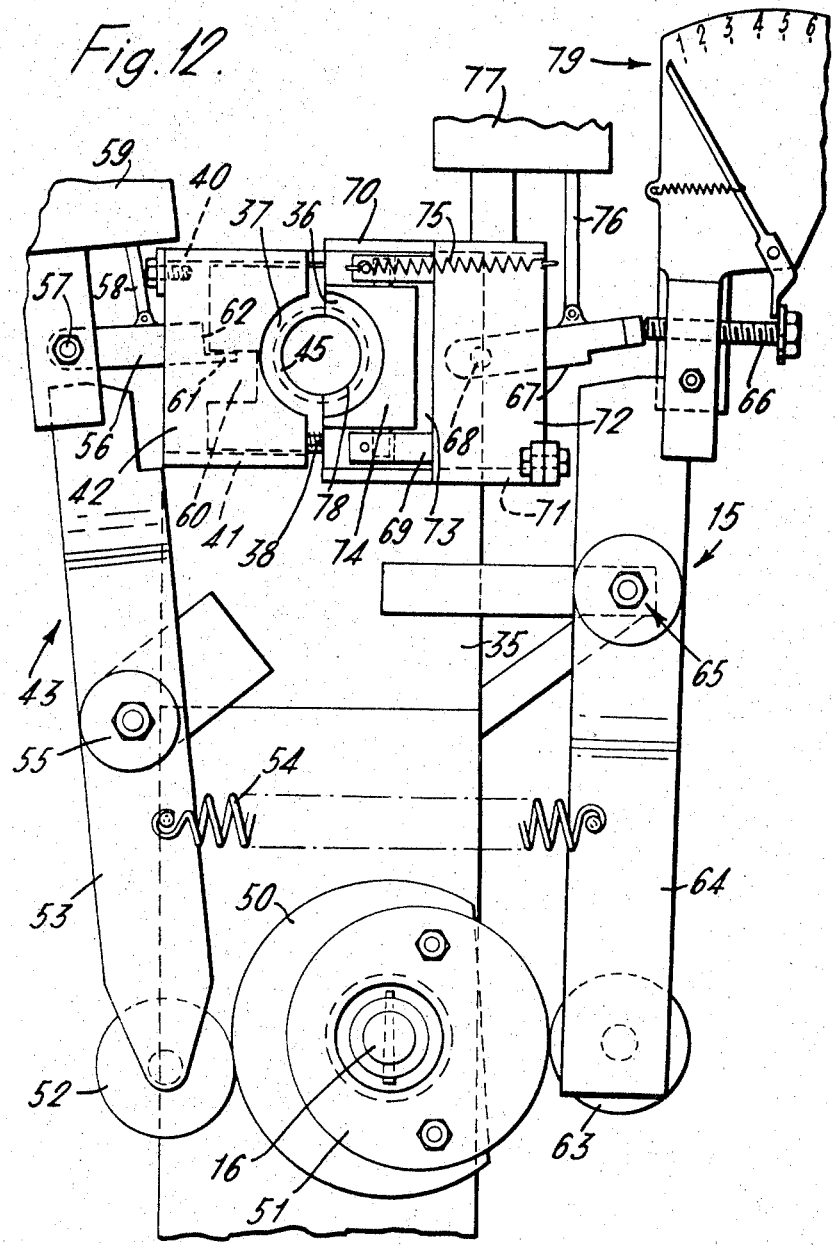
Figure 13:
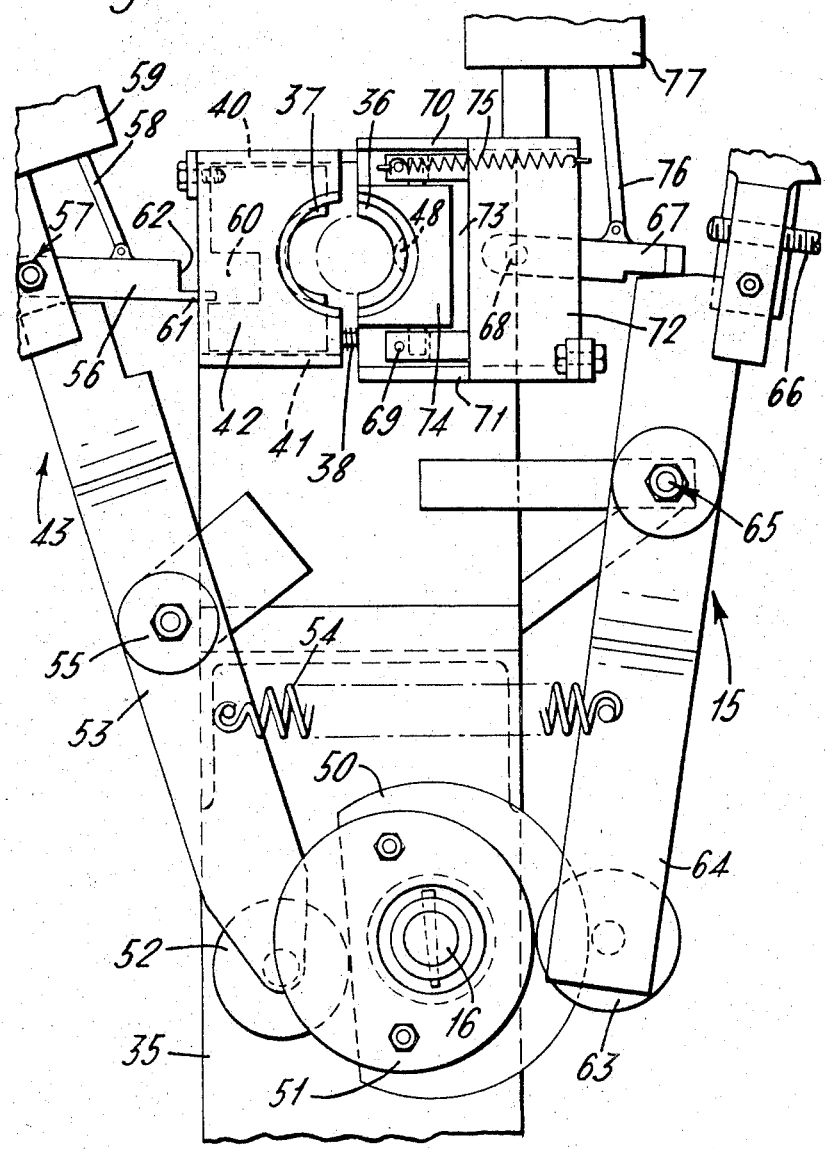
Figure 14:
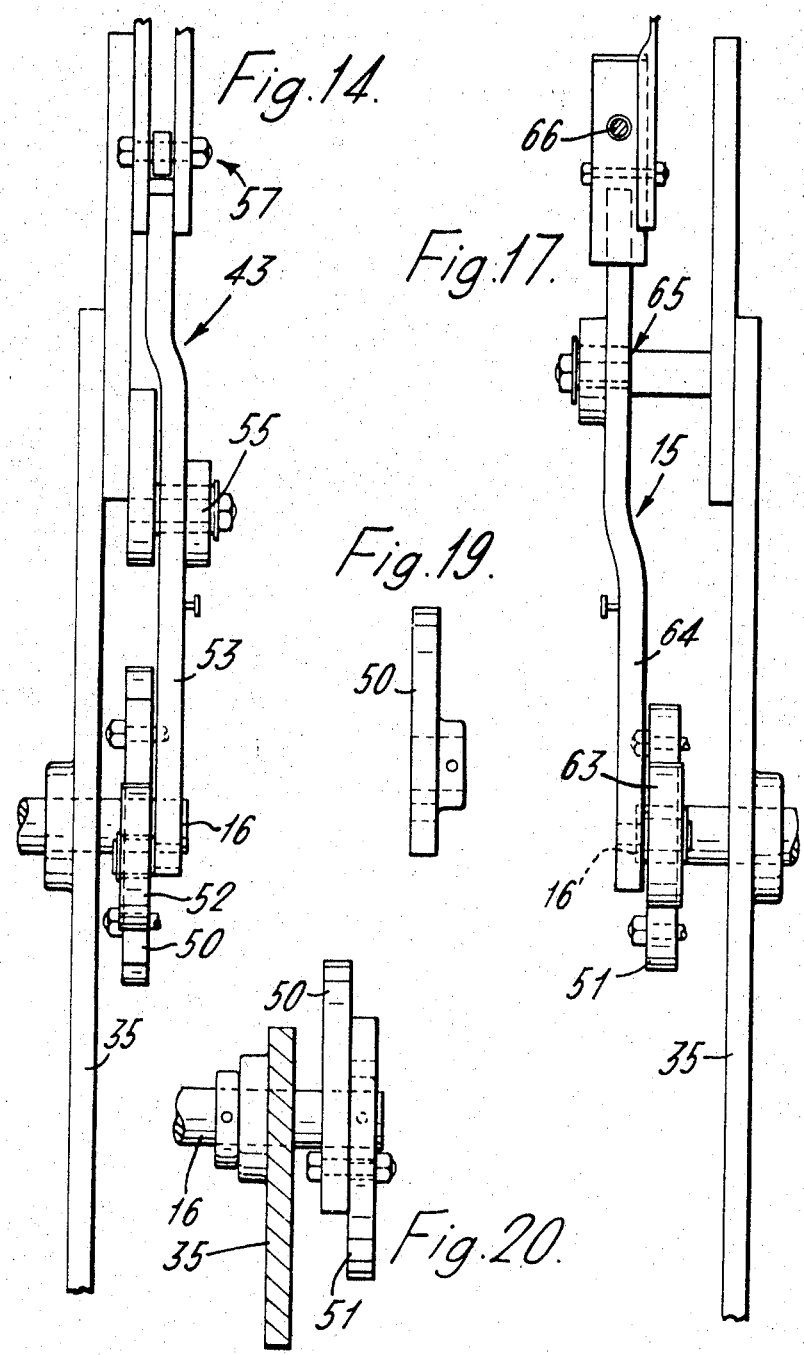
Figure 15:
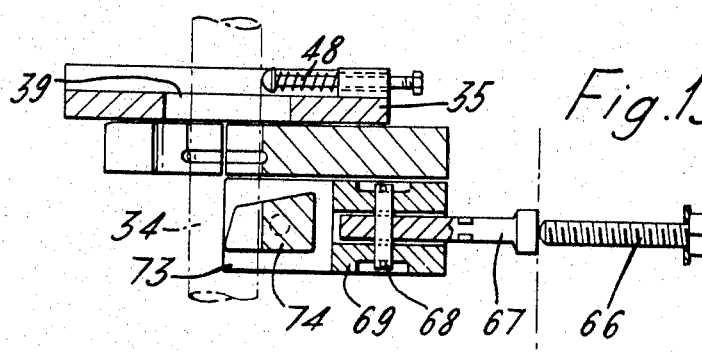
Figure 16:
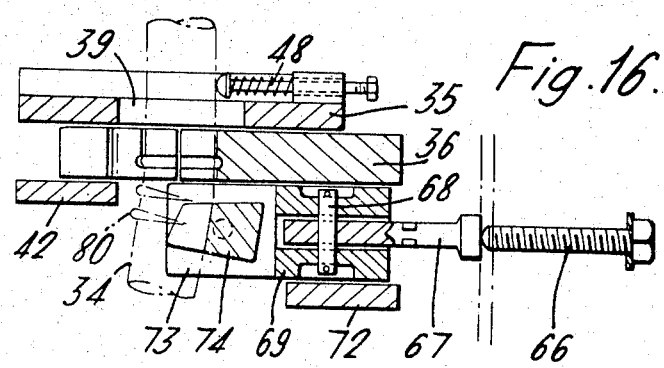
Figure 18:
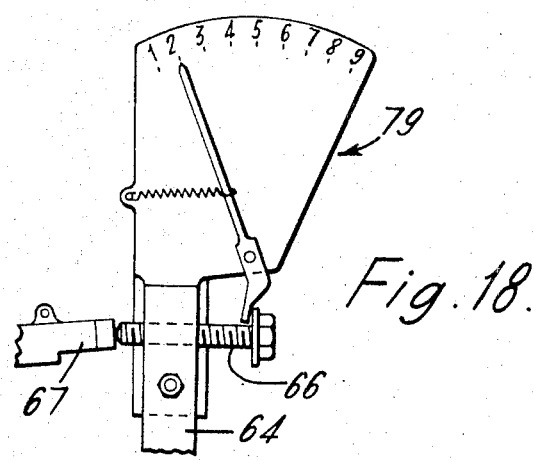
Figure 33:
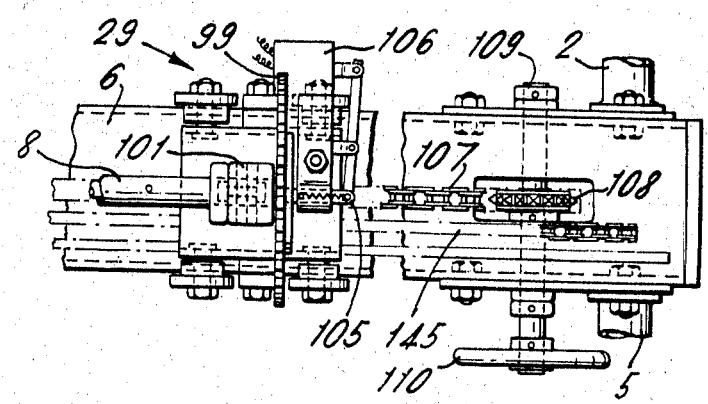
Figure 34:
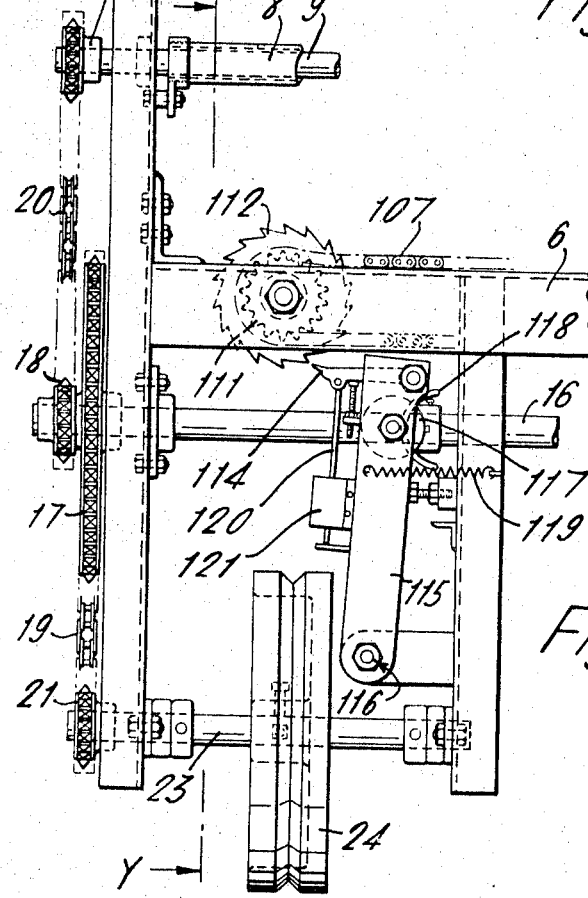
Figure 35:
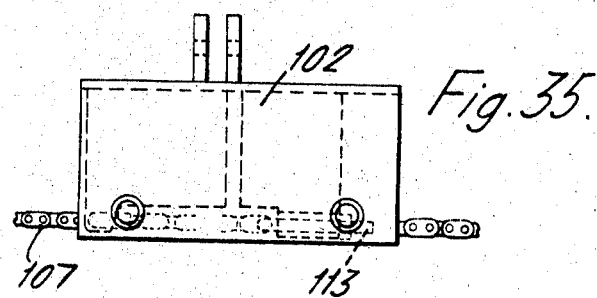
Figure 36:
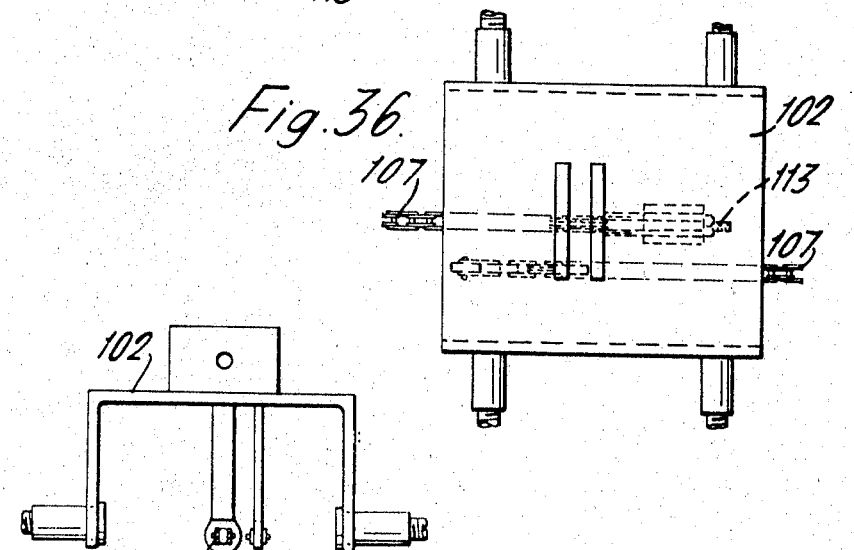
Figure 37:
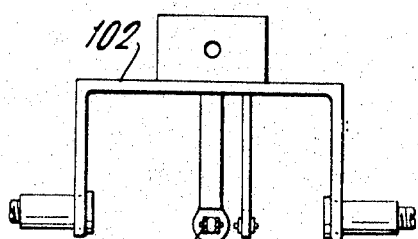
Figure 38:
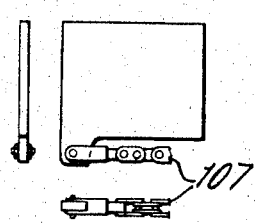
Figure 39:
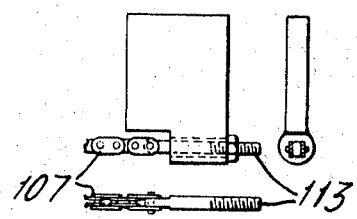
Figure 42:
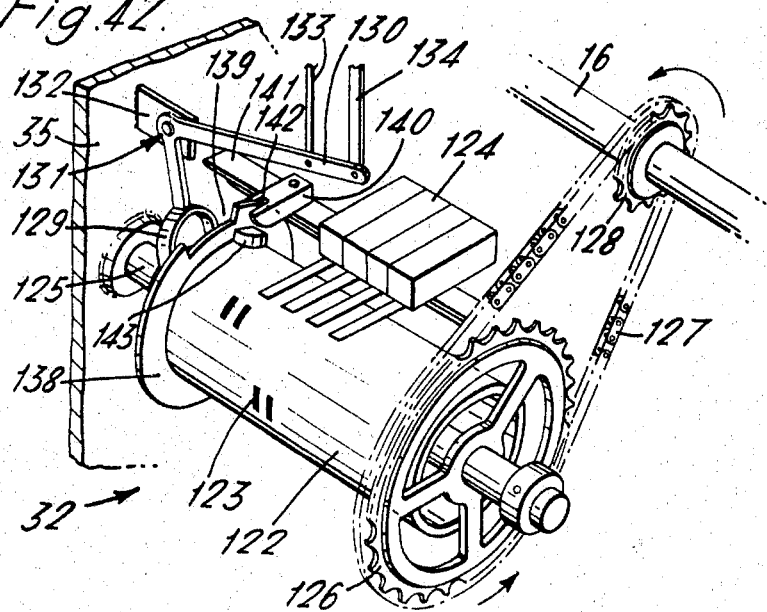
Figure 43:
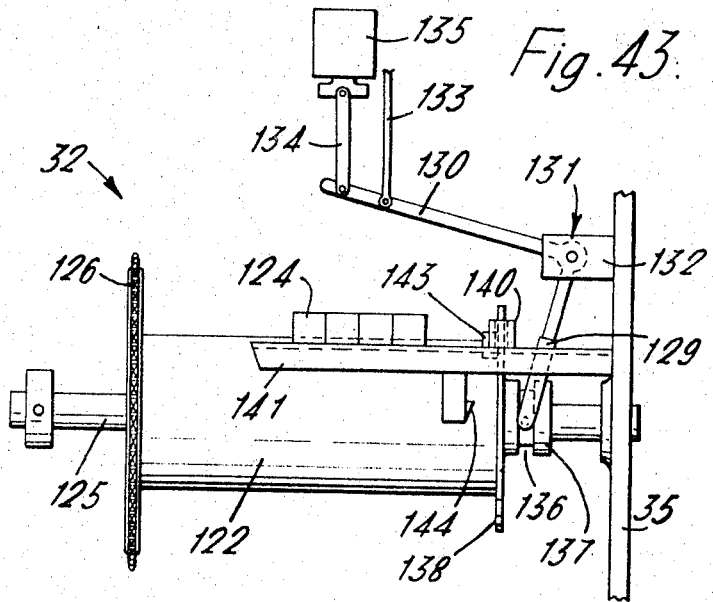

FIGURE 4 is a general side elevation of the apparatus according to the present invention illustrating the frame and showing the general relationship between the main operative parts but with certain more detailed parts omitted, FIGURE 5 is an end view of FIGURE 4 in the direction of arrow A, FIGURE 6 is a plan view of the frame and some of the associated parts shown in FIGURE 4, FIGURE 7 is an end view of FIGURE 4 in the direction of arrow B, FIGURE 8 is a sectional plan through the tube support means shown in greater detail, FIGURE 9 is a front elevation of the clamping blocks and cam wheel showing the cam wheel positioned at its minimum position of eccentricity, FIGURE 10 is a view as in FIGURE 9 but with the cam wheel shown at its position of maximum eccentricity, FIGURE 11 shows the clamping blocks unclamped and the cam in its minimum position of eccentricity, FIGURE 12 is a front elevation showing the actuating means for the sliding clamping block and the forcing means with the component parts of both positioned for operation, FIGURE 13 is a view as FIGURE 12 but with the component parts shown in the inoperative position, FIGURE 14 is a side elevation of part of the actuating means, FIGURE 15 is a sectional plan through the forcing means, prior to the force being applied to bend the tube, FIGURE 16 is a view as in FIGURE 15 but with a forcing means operated to apply a force to collapse a rib of the tube, FIGURE 17 is an elevation of part of the forcing means, FIGURE 18 shows a detail of a gauge associated with an adjustment screw in the forcing means, FIGURES 19 and 20 show the operating cams for the forcing means and actuating means in more detail, FIGURE 21 is a plan view of the clutch means associated with the cam shaft, FIGURE 22 is an elevation of the clutch means as in FIGURE 21, FIGURE 23 is a cross section through the plane X—X on FIGURE 22, FIGURES 24 and 25 are details of the clutch plates, FIGURES 26 to 28 show the clutch release lever and parts of the clutch plates in sequential positions, FIGURE 29 is an end view of the tube holding means, FIGURE 30 is a side elevation of the tube holding means, FIGURES 31 and 32 show details of a trolley for the tube holding means, FIGURE 33 is a plan view of FIGURE 30, FIGURE 34 is a side elevation part of the automatic driving means, FIGURES 35 to 39 show details of the connection between the chain of the advancement means and the trolley of the tube holding means, FIGURE 40 is a plan view of part of FIGURE 34, FIGURE 41 is a cross sectional elevation of FIGURE 34 on line Y—Y, FIGURE 42 is a diagrammatic representation of the solenoid sequencing means, and FIGURE 43 is a diagrammatic side view of parts of the apparatus shown in FIGURE 42.

With the particular form of apparatus described hereunder and shown in the drawings it has been found preferable to form two ribs before the tube is bent for the first time. This is because the first rib, being transverse, gives some extra strength to the tube and prevents it from deforming at the point where the force is applied to bend the tube. Also the first rib when formed produces a slight bend in the tube in the desired plane so that folding about the second rib proceeds in the same plane without twisting when force is subsequently applied. The formation of the two or more ribs also means the forcing means does not need to move the tube so far as the bend has been partially made by the ribs. With the tube mentioned the maximum height of a rib is about one eighth of an inch, the distance between adjacent ribs is about nine sixteenths of an inch and the approximate bend at each rib before and after collapsing is three degrees and fifteen degrees respectively. FIGURES 1, 2 and 3 illustrate these points. The sequence of steps involved in forming a completed bend in a tube may therefore be as follows:

(1) The tube is clamped between the clamping blocks.

(2) A rib is formed which lies within the clamping blocks.

(3) The clamping blocks unclamp the tube.

(4) The tube is advanced so that the first wrinkle or rib lies a suitable distance forward of the clamping means.

(5) The tube is clamped between the clamping blocks.

(6) A second rib is formed which lies within the clamping blocks.

(7) The clamping blocks unclamp the tube.

(8) The tube is advanced so that two ribs now lie in front of the clamping means.

(9) The tube is clamped between the clamping blocks.

(10) A third rib is formed which lies between the clamping blocks.

(11) The tube is released.

(12) The clamping blocks clamp the tube again, the third rib still lying between the clamping blocks.

(13) The tube is bent about the second rib, and also first rib to some extent, by applying force adjacent to first rib.

(14) The tube is unclamped.

(15) The tube is advanced.

(16) The tube is clamped again and the sequence from (10) onwards is automatically repeated, the tube being next bent about the third rib etc. until the bend is formed.

The apparatus is generally shown in FIGURES 4 to 7 and includes a trestle shaped supporting frame 1 which has two pairs of divergent legs 2 to 5 at either end of a channel member 6. Fastened above and parallel to the channel member is a tube support means 7 which includes a tube 8 housing a rotatable cam shaft 9. At the rear or driving end of the frame where the motor 10 is situated the tube 8 is fastened to the frame. This junction is clearly shown in FIGURE 34.

The other end of the tube 8 adjacent to the forward end of the apparatus is free to move to a certain extent and is equipped with an eccentric mandrel means 11 forming the internal support and thus part of the support means for the tube adjacent to where the bend is to be formed. The cam shaft 9 fitting neatly within the tube 8 has a stub axle 33 eccentrically mounted projecting from the end thereof and a cam 12 is rotatably mounted on this shaft to form the rib forming means 13 and will be described in greater detail hereafter. Clamping means 14 and forcing means 15 partly shown in FIGURE 4 are located at the forward end of the frame 1 and adjacent to the mandrel 11 so that the clamping blocks in use encircle the protruding end of the shaft 9 and form the external part of the support means in use acting to confine movement or unwanted deformation of the pipe during the rib being formed and to provide support for the tube against which forcing means may be applied to collapse or partially collapse the rib during the bending of the tube.

A timing shaft 16 lies parallel to and underneath the channel member 6. At the rear end of the timing shaft are fastened a large cog wheel 17 and a small cog wheel 18 which are coupled by chains 19 and 20 to cog wheels 21 and 22, located on a short shaft 23 and the cam shaft 9 respectively. The cog wheels 18 and 22 are the same size so that the cam shaft 9 when rotating rotates at the same speed as the timing shaft 16. The short shaft 23 which is housed in the supporting frame parallel to the channel member 6 mounts a large V-pulley 24 which is coupled by a belt 25 to a small V-pulley 26 attached to the motor 10. By using a belt drive between the motor and the short shaft a simple form of clutch is provided which will operate should the machine become jammed.

A further clutch means 27 is provided so that the cam shaft 9 may be rotated as desired, it being understood that the timing shaft 16 rotates continuously while the motor 10 is in operation. In use a tube 34 to be bent is slid over the mandrel means 11 and over the tube 8 so that the point at which the bend is desired to be started is adjacent the clamping means 14. Advancement means 28 which includes tube holding means 29, manual driving means 30 and automatic driving means 31 enable the tube to be advanced the necessary distance between successive ribs or successive bends in the tube. Solenoid sequencing means 32 are provided to ensure that the solenoids which are used in the machine are actuated in correct sequence as will be described hereunder.

FIGURE 8 shows details of the rib forming means. The cam shaft 9 has an eccentric stub shaft 33 around which a cam wheel 12 is free to rotate. The cam wheel reduces the friction to some extent between the wall of the tube 34 and the cam when the rib is being formed than would otherwise be the case if a fixed cam were used which would not roll around the tube as the rib was being formed. Fastened eccentrically to the end of the tube 8 is the mandrel means 11 which is an easy sliding fit inside the tube 34. The eccentricity of the stub shaft 33 and the outside diameter of the cam wheel 12 are chosen so that in the minimum position of eccentricity of the cam wheel the cam wheel will not touch the wall of the tube. Also shown in FIGURE 8 is the front plate 35 of the supporting frame and clamping means 14 which include a fixed clamping block 36 and a slidable clamping block 37 normally held apart by a spring 38.

FIGURES 9, 10 and 11 show views of the clamping blocks 36 and 37 and the cam wheel 12 in various positions during the formation of a rib. The fixed clamping block 36 is fixed by welding or other suitable means to the front plate 35 which includes an aperture 39 (FIGURE 5) through which the tube 34 and the cam shaft 9 pass in normal use to be adjacent to the clampings means 14. The sliding block 37 moves in a horizontal direction constrained by plates 40, 41 and 42 (FIGURES 12 and 16) and is actuated by sliding means 43 described hereunder. Each of the clamping blocks 36 and 37 has a semi-cylindrical channel 44 and 45 respectively. Each of the channels 44 and 45 has a groove 46 and 47 respectively in which the rib lies as it is formed. FIGURE 9 shows the tube 34 clamped between the clamping blocks and the cam wheel 12 in its minimum position of eccentricity. FIGURE 10 shows the tube still clamped between the clamping blocks and the cam wheel in its maximum position of eccentricity. FIGURE 11 shows the tube unclamped and the cam in its minimum position of eccentricity.

A spring loaded plunger 48 ensures that when the clamping blocks are separated the tube 34 and the tube support means 7 lying within the tube are pushed away from the fixed clamping block 36 for a suitable distance so that the tube may be advanced ready for the next rib to be formed. The completed rib on tube 34 is indicated by numeral 49.

Actuating means 43 for the slidable block 33 is shown in FIGURES 12, 13 and 14. A cam 50 is concentrically fastened to the timing shaft 16 and cam 51 is eccentrically fastened to the timing shaft 16, and has a segment removed from its circumference to provide the cam action. A cam following race 52 attached to the end of a lever 53 is caused to follow the profile of the cam 50 by means of a spring 54. The lever 53 is pivoted about an eccentric bush 55 (FIGURE 14). The upper end of the lever 53 adjacent to the sliding block 37 is equipped with a pushing arm 56 pivotally attached to the lever at 57.

The pushing arm 56 is pivotally attached by a link 58 to the armature of a solenoid 59 which is also attached to lever 53. In the sliding block 37 opposite the semicircular channel 45 is a rectangular channel 60 in which the pushing lever 56 may freely slide when the solenoid 59 is not actuated. A small finger 61 is provided on the end of the pushing arm 56 to control the lower and the upper positions of the pushing arm. FIGURE 13 shows the conditions prevailing when the solenoid 59 is not energized. The finger 61 then rides upon the lower side of the channel 60 and the sliding block 37 is not moved as the pushing arm 56 moves in and out of the channel 60 which reciprocal movement occurs once for every revolution of the timing shaft 16. FIGURE 12 shows the situation prevailing when the solenoid 58 is energised. Under these conditions the pushing arm 56 is raised and the finger 61 bears against the upper side of the channel 60 so that when the pushing arm 56 is advanced as the cam 50 is rotated the end face 62 bears against the sliding block conditions the pushing arm 56 is raised and the finger 61 bears against the upper side of the channel 60 so that when the pushing arm 56 is advanced as the cam 50 is rotated the end face 62 bears against the sliding block 37 which is then forced to approach the fixed block 36, thus enabling the tube to be clamped. The eccentric bush 55 is provided so that the travel of the sliding block 36 may be readily adjusted to prevent the tube from being clamped either too loosely or too tightly.

In order that the tube may be bent about a rib forcing means 15 are provided (FIGURES 12, 13, 15, 16 and 17). The forcing means includes the eccentric cam 51 and a race 63 attached to the lower end of a lever 64. The race 63 is forced to follow the profile of the cam by the spring 54. The lever 64 is pivoted at 65 about an extension of the front plate 35 and at its upper end is provided with a bolt 66 which can be caused to bear against a movable push rod 67. The movable push rod 67 is pivoted about a pin 68 attached in a sliding block 69 arranged to slide horizontally adjacent to the fixed block 36 and constrained by plates 70, 71 and 72. The sliding block 69 has a channel 73 in the face adjacent to the tube in use and within this channel a forcing block 74 is vertically pivoted. A spring 75 ensures that the combination of the sliding block 69 and the forcing block 74 is normally held away from contact with the tube.

The movable push rod 67 is pivotally attached by a link 76 to the armature of a solenoid 77. When the solenoid is energized the movable push rod 67 is raised to a position where it may be periodically contacted by the end of the bolt 66. When this happens the combination of the sliding block 69 and the forcing block 74 advances towards the tube which is in use clamped between the supporting blocks 36 and 37. The face of the forcing block 74 which contacts the tube has a semi-circular channel 78 to spread the force as evenly as possible over a large area of the tube.

The bolt 66 is adjustable and determines the distance over which the forcing block 74 moves and hence the angle through which the tube is bent. A scale 79 (FIGURES 12 and 18) is adapted to show the amount of bend being imparted to the tube. FIGURE 12 shows the forcing block 74 in a forward position relative to the tube, that is with the solenoid 77 energised and the cam 51 imparting almost the maximum throw to the lever 64. FIGURES 19 and 20 give further details of the lever and cam arrangement. FIGURES 15 and 16 illustrate how the forcing block 74 pivots as it contacts the tube 34 to bend it about the rib 80.

The cam shaft 9 needs to rotate only once to form a rib in the tube. As the timing shaft 16 and hence the cog wheel 22 are rotating continuously a clutch means 27 as illustrated in FIGURES 21 to 28 is provided. A clutch plate 81 is fastened adjacent to one end of the cam shaft 9 and the small cog wheel 22 is integral with another clutch plate 82 which is normally separated by a small distance from the clutch plate 81. In the integral combination of the cog 22 and the clutch plate 82 a groove 83 is provided in which lie two pins 84 carried on a yoke 85 fastened to one end of an L-shaped lever 86. The L-shaped lever 86 is pivoted at its apex 87 and at the end opposite the yoke 85 is pivotally coupled by a link 88 to the armature of a solenoid 87. The arrangement is such that when the solenoid 89 is energised, the two clutch plates 81 and 82 are forced in contact as described hereunder, the chain 20 (FIGURE 7) having sufficient give or play to enable this to occur. The clutch plate 81 has a channel 90 adjacent the circumference (FIGURE 23). The clutch plate 82 has a channel engaging block 91 (FIGURE 24) which can lie within the channel 90 when the clutch plates are in close proximity. The channel engaging block 91 is extended beyond the circumference of the clutch plate 82 to form a wedge shaped clutch release block 92. When the clutch plates are engaged and the cam shaft has been driven through one turn in its normal direction rotation (anti-clockwise), the wedge shaped clutch release block 92 comes into contact with a clutch release lever 93, arranged to pivot at 94 about the supporting frame 1 (FIGURE 22). The clutch release lever 93 is normally held in position by a spring 95. FIGURES 26, 27 and 28 show how the clutch plates 81 and 82 are progressively separated as the wedge shaped clutch release block 92 comes into contact with the clutch release lever 93. In use when the solenoid 87 is energized there is a tendency for the clutch plate 82 to move into contact with the clutch plate 81. Engagement will finally occur when the channel engaging block 91 is in line with the channel 90. When the clutch is engaged the cam shaft 9 is rotated through one turn in an anti-clockwise direction thus enabling a rib to be formed before the clutch is disengaged. By this time the solenoid 89 is deenergized once more. The clutch is arranged so that the cam wheel 12 in its rest position does not touch the inner walls of the tube after the rib has been formed, that is, the cam wheel is in its position of minimum eccentricity and to make sure that the cam shaft 9 does not free wheel a spring loaded plunger 96 mounted on the supporting frame 1 bears against the clutch plate 81 as it rotates. In the desired rest position of the cam shaft the spring loaded plunger 96 engages with a dimple 97 formed in the circular face of the clutch plate 81.

Advancement means 28 are provided which allow the tube to be advanced automatically or advanced and withdrawn manually when the tube is not clamped by the clamping blocks 36 and 37. A tube holding means 29 (FIGURES 29 and 30) is provided which clamps over the rear end portion of the tube to be bent 34. The holding means is secured to the channel member 6 to resist rotation of the tube while the tube is being advanced, i.e. so that a bend which is started in one plane continues in that plane. A split boss 98 is adapted to clamp onto the end of the tube 34. Attached to one half of the split boss 98 is a graduated notched disc 99 concentric with the axis of the tube 34. Further attached to the combination of the boss and the disc is a sleeve 100 which is a sliding fit over the tube 8. The sleeve 100 is pivoted inside a connecting rod 101 which attaches the assembly of sleeve, disc and split boss to a trolley 102 which rides upon the channel member 6. The trolley 102 is equipped with wheels 103 which ride along the top of the channel member and wheels 104 which ride underneath the flanges of the channel member 6, the combination thus restraining the trolley from moving in other than a longitudinal direction along the channel (FIGURES 29, 30, 31 and 32). The notches in the graduated disc 99 may be engaged by a pin 105 controlled by a solenoid 106. When the solenoid 106 is energized and the pin 105 withdrawn from a notch the tube 34 may be rotated freely. However, when the solenoid 106 is unenergized the graduated disc 99 and hence the tube 34 cannot be rotated. This is the condition which usually prevails as ribs are being formed. The solenoid 106 is arranged to be operated by a switch (not shown) suitably positioned at the forward end of the machine where the protruding length of the tube can be grasped by the operator and rotated as required. The trolley 102 is advanced along the channel member 6 by means of a chain 107 (FIGURES 6 and 33). At the forward end of the machine the chain passes over a cog wheel 108 on a shaft 109, which may be rotated by means of a hand wheel 110. At the rear end of the apparatus the chain 107 passes over a cog wheel 111 integral with a ratchet wheel 112 (FIGURE 34). The ends of the chain are attached to the trolley (FIGURES 35 to 39) and adjustment means 113 (FIGURE 39) are provided so that the chain 107 may be suitably tensioned. When the tube 34 is not clamped between the clamping blocks 36 and 37 a hand wheel 110 may be used to advance the trolley 102 along the channel member 6. It will be understood that the hand wheel 110 forms part of the manual driving means 30.

In order that the ribs may be formed successively at even spacings an automatic driving means 31 is provided so that the trolley 102 may be advanced in fixed steps of equal distance. FIGURES 34, 40 and 41 show the general arrangement of the automatic driving means 31. A pawl 114 is pivotally attached to a lever 115 which is in turn pivoted at 116 about the supporting frame 1. The lever 115 has attached to it a cam following race 117 which follows the profile of a cam 118 mounted on the timing shaft 16. A spring 119 causes the cam following race 117 to closely follow the profile of the cam 113. The pawl 114 is pivotally attached by a link 120 to the armature of a solenoid 121 so that when the solenoid 121 is unenergized the pawl 114 cannot make contact with the ratchet 112 even though the lever 115 is being rocked backwards and forwards by the cam 118 which, it will be understood, is continuously rotating. However, if the solenoid 121 is energized the pawl 114 is raised to a position where it will engage with a tooth of the ratchet 112 every time the timing shaft 16 rotates through one turn. The number of teeth on the ratchet 112 and the diameter of the cog wheel 111 are, of course, among the determining factors which will influence the distance between successive ribs on the tube which is being bent. As well as being automatically operated via a solenoid sequencing means 32 described hereunder the solenoid 121 is also able to be actuated by a manual push button (not shown) at the forward end of the machine, so that after the trolley 102 has been manually advanced such as will occur after one bend has been made in the tube and the tube has been advanced preparatory to making another bend, the pawl 114 may be caused to engage the ratchet 112 at least once. If this were not done and the rib were formed the next rib might not be separated by its full distance from the first rib because the ratchet 112 might not be so positioned that the pawl 114 would rotate the ratchet through the normal angle.

By a suitable modification of the cog wheel and number of teeth provided thereon, together with the ratchet it is possible to provide an adjustable advancement. Thus where a tube is being bent over a larger radius, the spacing between successive ribs could be increased, for example by causing the attachment means to move along two or more links of the chain, for example spacings between the ribs of up to 1½″ may be provided. In this way the adjustment of the rib spacings as well as the movement of the forcing means will provide variables to control the radius of the bend in the pipe.

The necessary sequence of operations of the solenoids could be controlled manually by switches positioned near the forward end of the apparatus, but, as it is generally more convenient, the operation is made partly automatic. Three modes of operation are required:

Mode 1: The timing shaft 16 is revolving but the cam shaft 9 is not and none of the four solenoids 59, 77, 89 or 121 are energized. (It will be understood of course that solenoid 106 is normally energized to maintain the graduated disc 99 in the desired position of rotation.) When the electrical system is in the first mode, the solenoid 121 may be energized via a suitable push button as hereinbefore mentioned to cause the pawl 114 to engage the ratchet 112 at least once to ensure that the ratchet teeth are correctly disposed from the pawl. During this mode of operation the tube 34 may also be mounted on the apparatus and clamped in the split boss 98 or manually advanced by means of the manual driving means 30.

Mode 2: This mode is that pertaining while the first two ribs are made in the tube, i.e. while steps 1 to 8 set out hereinbefore are accomplished. In practice the solenoids 59 and 89 which enable the tube to be clamped and the cam to be rotated are energized and de-energized together, as the mechanical arrangement is such that the tube is clamped just before the rib starts to be formed. When these two solenoids have been de-energized, the solenoid 121 is energized to advance the tube, the first rib having been made. The sequence repeats until the second rib has been made.

Mode 3: A mode 3 operation consists of steps 9 to 16, that is solenoids 59 and 89 are energized and de-energized together so that the clamping blocks 36 and 37 clamp the tube while a rib is being formed and then solenoid 59 is actuated together with solenoid 77 so that the tube is clamped while it is being bent by the forcing block 74. Both of these solenoids are de-energized at the same time and solenoid 121 is energized so that the tube is advanced. The sequence then repeats itself. To achieve the three modes of operation solenoid sequencing means 32 which includes a multiple cam drum 122 (FIGURES 42 and 43), is provided. The drum 122 is equipped with suitable cams 123 which operate four micro-switches 124 controlling the four solenoids 59, 77, 89 and 121. The drum 122 is pivotally mounted on a short shaft 125 fixed to the supporting frame and the drum is equipped with a large sprocket 126 which is attached by a chain 127 to a small sprocket 128 mounted on the timing shaft 16.

When the timing shaft rotates the drum 122 is driven at one-third the speed of rotation of the timing shaft. The drum may be slid along its shaft 125 by means of a yoke 129 attached to an L-shaped lever 130 pivoted at 131 about a bracket 132 attached to the front plate 35 of the supporting frame. To the free end of the lever 130 are attached a control rod 133 which can be actuated by a lever (not shown) adjacent to the hand wheel 110 and a connecting link 134 which pivotally connects the lever 130 with the armature of a solenoid 135. The yoke 129 has two radial pins (not shown) which slide in a groove 136 formed in an inner sleeve 137 of the drum. The drum 122 has a circular plate 138 opposite the large sprocket 126. A channel 139 is formed adjacent the circumference of the plate 138. A slotted guide 140 is fastened onto a suitable bracket 141 protruding from the front plate 35 and is so arranged that the plate 138 may rotate within the slot 142 of the slotted guide 140. Also fastened to the face of the plate 138 adjacent to the drum 122 is a wedge shaped block 143. Fastened to the bracket 141 is a second wedge shaped block 144.

When the apparatus is in the first mode of operation the circular plate 138 rotates within the slot 142 and none of the micro-switches 124 are actuated (by any of the cams 123) as the drum 122 revolves.

In the second mode of operation the rod 133 is raised so that the drum 122 moves to the rear of the shaft 125. Following this manoeuvre the drum can rotate anticlockwise one turn before the wedge 143 fastened onto the circular plate 138 comes in contact with the wedge 144 fastened to the bracket 141. At this point the channel 139 is opposite the slotted guide 140 and the wedges as they progressively engage cause the drum to take up the mode 1 position. If the rod 133 is not maintained in a raised position, only one rib will be formed. To make two ribs the rod 133 is raised again until the second rib has been made.

Mode 3 results when the rod 133 is depressed. The drum 122 then slides to the forward end of the shaft 125 to lie adjacent to the front plate 35. Under these conditions the steps detailed in mode 3 are automatically carried out. The solenoid 135 can also move the drum from the third mode to the first mode and it is convenient to have the solenoid 135 operated by a micro-switch (not shown) fastened underneath the trolley 102. The micro-switch fitted underneath the trolley can be arranged to contact a suitable stop placed along the upper surface of the channel member 6 so that when the tube has moved through a predetermined distance no more ribs are formed. Conveniently the stops are placed between the links of a chain 145 (FIGURE 33) of half an inch pitch.

To make a sequence of bends of desired radii at desired intervals and in desired planes the operator carries out the following steps:

Provided the control rod 133 is in a position so that the multiple cam drum 122 is in mode 1 type of operation, the operator can slide a suitable length of tube over the mandrel means 11 and along the tube 8 to the tube holding means 29. The end of the tube is then clamped between the split boss 98 and the hand wheel 110 is used to advance the trolley 102 so that the position on the tube where the first rib is to be formed is adjacent to the cam wheel 12. Using the tube mentioned the lap welded seam is arranged to be on the outer circumference of the bends if possible. Having used the manual driving means to advance a tube the solenoid 121 is operated momentarily so that the ratchet wheel 112 takes up its correct position. The control rod 133 is then raised momentarily so that the drum 122 takes up the mode 2 position so that one rib is formed and the tube advanced. The control rod 133 is again raised momentarily so that a second rib is formed and the tube advanced. The control rod 133 is then lowered and the drum 122 assumes its third mode of operation and ribs are automatically formed at nine-sixteenths of an inch intervals and collapsed by the forcing means 15 which also comes into operation when the drum 122 is in its third mode.

Prior to bending the tube the bolt 66 is adjusted so that each rib will be collapsed the desired amount as indicated on the scale 79 and if, for example, sixteen ribs are to be formed a stop, as mentioned, can be suitably placed on the chain 145, so that after the trolley 102 has advanced nine inches, the solenoid 135 is actuated momentarily returning the multiple cam drum 122 to its mode 1 position.

When the first bend is completed the operator may manually advance the tube by means of the hand wheel 110 and, if necessary, the solenoid 106 may be energized to allow the tube to be rotated through a suitable angle so that the next bend is formed in the desired plane. The solenoid is then de-energized so that the tube is locked in position. The ratchet wheel 112 is then positioned and if the radius of the second bend is to differ from that of the first the operator adjusts the bolt 66 so that the bend will be of the desired radius. By suitable operation of the control rod 133 the first two ribs are made and the bend automatically completed.

When the last bend has been made the drum 122 will of course, be in its mode 1 position and the split boss 98 may be unclamped from the tube and the tube withdrawn from the machine.

It will be appreciated that a certain amount of experimental work is necessary to produce a tube with bends of the desired radius and in the correct planes. However, once this experimental work has been done tables may be readily compiled showing the radii of the bends achieved and the angle through which the tube has been bent, for various numbers of ribs and readings on the scale 79.

The graduated notched disc 99 may have notches at 10 degrees which are each numbered from 0 to 36 for example.

A suitable rule fastened to the channel member 6 can indicate the distance between the trolley 102 and some other reference point at the forward end of the machine so that for sequential runs where the same distance between similar bends in the tubes is desired tables can be drawn up showing to what point on the rule the trolley must be manually advanced before bending is commenced. Stops may then be placed in the chain 145 at a suitable distance so the desired number of ribs are automatically formed and bent before the drum 122 returns to its mode 1 position.

It will thus be seen that the machine needs only one operator and lends itself particularly to quantity runs of bent tubing such as, for example, vehicle exhaust pipes. Further it should be noted that once any particular exhaust pipe configuration has been determined in terms of the abovementioned parameters and recorded for example on a suitable card, then the machine may be rapidly converted to make one or more of that type of exhaust pipe as only the stops and the bolt 66 need initial adjustment. It will be appreciated that much of this programming could be reduced to automation with appropriate modifications to the feeding mechanism should this be so desired.

What we claim is:

1. A method of bending ductile metal tubing comprising the steps of supporting the tubing to be bent adjacent to where the bend is to be formed, forming an externally protruding rib around substantially half or more of the circumference of the tube, advancing the tube forwardly from the support, applying a force in front of the formed rib and on the side of the tube substantially diametrically opposite the maximum protuberance of said rib to bend said tube by partially or wholly collapsing said rib, forming a further rib in said tube and repeating the steps until the desired bend is formed.

2. A method as claimed in claim 1 including the step of forming two or more ribs in said metal tubing before applying a force to collapse or partially collapse said ribs.

3. A method as claimed in claim 2, including the step of using the spacing and/or the amount which the ribs are collapsed to control the radius of the bend formed in the pipe.

4. A method as claimed in claim 3, including the steps of internally supporting the tube to allow the rib to be formed and externally supporting the tube to provide a support against which the tube may abut when the force is applied to collapse or partially collapse the rib.

5. A method of bending ductile metal tubing comprising the steps of supporting a length of tubing over an internal support, externally supporting the tube adjacent to where the bend is to be formed, forming an externally protruding rib around substantially half or more the circumference of the tube, releasing the external support from the tube, advancing the tube so that the first rib lies a suitable distance forward from the external point of support, re-applying the external support to the tube, forming a second externally protruding rib surrounding substantially half or more of the circumference of the tube, applying a force in front of the formed rib and on the side of the tube substantially diametrically opposite the maximum protuberance of said rib to bend said tube by partially or wholly collapsing said rib, releasing the external support from said tube and repeating the steps until the desired bend is formed.

6. A method as claimed in claim 5, wherein the tube is advanced so that two externally protruding ribs surrounding substantially half or more of the circumference of the tube lie in front of the external point of support before a force is applied thereto to partially or wholly collapse the ribs.

7. Apparatus for bending ductile metal tubing comprising support means for supporting the tube to be bent adjacent to where the bend is to be formed, rib forming means for forming an externally protruding rib around substantially at least half of the circumference of the tube, advancement means for advancing the tube including the formed rib forwardly from the support means, and forcing means for applying a force in front of the formed rib and on the side of the tube substantially diametrically opposite the maximum protuberance of said rib to bend said tube by at least partially collapsing said rib.

8. Apparatus as claimed in claim 7, wherein said support means comprises tube positioning means forming an internal support for the tube before the position in the tube where the rib is to be formed and clamping means for externally clamping said tube about where said rib is formed.

9. Apparatus as claimed in claim 8, wherein said tube positioning means comprises a support tube having a substantially smaller diameter than the tube being bent and an eccentric mandrel means supported on the end of said support tube, said mandrel means being adapted to bear against the inner wall of said tube to be bent to provide an internal support.

10. Apparatus as claimed in claim 9, wherein said mandrel means comprises a short cylindrical member eccentrically attached to the end of said support tube.

11. Apparatus as claimed in claim 10, wherein said clamping means comprises an opposite pair of separable clamping blocks each adapted to clamp around half of a portion of the outer circumference of the tube to be bent adjacent where the rib is to be formed with each said clamping block having a circumferential groove formed therein to accommodate the rib when formed and actuating means arranged to open or close said clamping block in use.

12. Apparatus as claimed in claim 11, wherein said clamping means is adapted to support said tube while the rib is being formed and while the tube is being bent by said forcing means.

13. Apparatus as claimed in claim 12, wherein said rib forming means comprises a cam shaft adapted to rotate in said support tube and a cam head attached to the end of said cam shaft, said cam shaft being rotatably mounted about an axis parallel to the axis of the tube to be bent with said cam head adapted to form said externally protruding rib in said tube as said cam head is rotated.

14. Apparatus as claimed in claim 13, wherein said cam head comprises an eccentric stub shaft protruding from the end of said cam shaft and arranged to be positioned between said clamping means and a circular cam wheel adapted to be rotated about said stub shaft.

15. Apparatus as claimed in claim 14, wherein said cam is arranged, at the minimum point of eccentricity not to project to engage with the tube being bent.

16. Apparatus as claimed in claim 15, wherein said advancement means includes a tube holding means adapted to clamp over the end of the tube to be bent to resist rotation thereof.

17. Apparatus as claimed in claim 16, wherein said advancement means includes manual drive means adapted to drive said tube holding means to enable the tube to be advanced past said rib forming means.

18. Apparatus as claimed in claim 17, wherein said advancement means includes automatic operating means adapted to move said holding means so that the tube is automatically advanced by predetermined intervals.

19. Apparatus as claimed in claim 18, wherein a mechanical operating means is provided to allow advancement of the holding means in steps of equal intervals.

20. Apparatus as claimed in claim 19, wherein said automatic advance means is adapted to advance said tube by modular steps so that the formed rib lies just forward of said clamping blocks prior to said rib being collapsed.

21. Apparatus as claimed in claim 20, wherein said forcing means comprises a forcing block arranged to pivot about an axis normal to the plane in which the tube is to be bent, a sliding carriage pivotally supporting said forcing block and operating means adapted to move said carriage and said forcing block supported thereon to engage with the tube to partially to totally collapse the rib, thus bending the tube.

22. Apparatus as claimed in claim 21, wherein said forcing block is arranged to progressively bear on a large area of the tube to be bent forward of the rib positioned just beyond the clamping blocks.

23. Apparatus for bending ductile metal tubing comprising a tube positioning means supported at one end from a suitable supporting frame and having at the opposite end an eccentric mandrel means adapted to support the interior of a tube to be bent, a rib forming means rotatable through said tube positioning means and including an eccentric cam head adapted to form an externally protruding rib around substantially half or more of the circumference of the tube, external clamping means adapted to support the tube about the section where the rib is to be formed with grooves in said clamping means to allow for the formation of said rib, advancement means adapted to advance the tube in steps along said tube positioning means so that the rib formed by said rib forming means is advanced to lie at least beyond said clamping means and forcing means adapted to apply a force in front of the formed rib advanced beyond said clamping means and on the side of the tube substantially diametrically opposite the maximum protuberance of said rib to bend said tube by partially or wholly collapsing said rib.

24. Apparatus as claimed in claim 23, including control and timing means adapted to control the sequence of operations so that the tube is clamped between the clamping means a rib is formed by said rib forming means the tube is released from said clamping means the tube is advanced so that the first rib lies a suitable distance forward of said clamping means, the tube is re-clamped between said clamping means a further rib is formed within said clamping means by said rib forming means the tube is released from said clamping means the tube is again advanced so that two ribs lie in front of the clamping means the tube is again reclamped by the clamping means a yet further rib is formed within said clamping means by said rib forming means the forcing means is actuated to apply a force adjacent to the first rib to bend the tube by partially or wholly collapsing said ribs the tube is released from the clamping means, the tube is advanced so that the third rib is positioned in front of the clamping means and repeating the above sequence of operations with the force applying means being applied to each rib now advanced from said clamping means.

References Cited

UNITED STATES PATENTS

| | | | |
|---|---|---|---|
| 889,173 | 5/1908 | Brune | 72—369 |
| 1,010,733 | 12/1911 | Dieckmann | 72—404 |
| 1,047,375 | 12/1912 | Brune | 72—404 |

RONALD D. GREFE, *Primary Examiner.*

U.S. Cl. X.R.

72—370, 415